United States Patent [19]

Shimamoto et al.

[11] Patent Number: 4,626,614

[45] Date of Patent: Dec. 2, 1986

[54] GAS COOLED CURRENT LEAD FOR SUPERCONDUCTING MACHINE

[75] Inventors: Susumu Shimamoto, Tokai; Toshinari Andoh, Katuta; Eisuke Tada, Katsuta; Yoshikazu Takahashi, Tokai; Akira Ishihara, Yokosuka; Yoshihiko Shindoh, Fujisawa; Ikuo Itoh, Mobara, all of Japan

[73] Assignees: Japan Atomic Energy Research Institute, Tokyo; Fuji Electric Co., Ltd., Kawasaki, both of Japan

[21] Appl. No.: 726,983

[22] Filed: Apr. 25, 1985

[30] Foreign Application Priority Data

Jun. 15, 1984 [JP] Japan .................................. 59-122000

[51] Int. Cl.⁴ ............................................. H01B 7/34
[52] U.S. Cl. .............................. 174/15 S; 174/15 CA; 174/15 C
[58] Field of Search ............... 174/15 BH, 15 C, 15 S, 174/15 CA

[56] References Cited

U.S. PATENT DOCUMENTS

| | | |
|---|---|---|
| 3,603,715 | 9/1971 | Eilhardt et al. ................... 174/15 S |
| 3,604,833 | 9/1971 | Beck .................................. 174/15 S |
| 3,708,606 | 1/1973 | Shattes et al. ..................... 174/15 S |
| 4,048,437 | 9/1977 | Vander Arend et al. ......... 174/15 S |

FOREIGN PATENT DOCUMENTS

| | | |
|---|---|---|
| 2114131 | 10/1972 | Fed. Rep. of Germany .... 174/15 S |
| 484597 | 3/1976 | U.S.S.R. ......................... 174/15 BH |

Primary Examiner—Arthur T. Grimley
Assistant Examiner—Morris H. Nimmo
Attorney, Agent, or Firm—Oblon, Fisher, Spivak, McClelland & Maier

[57] ABSTRACT

A large number of fine electrical conductor wires (5, 6) are densely packed in a tube (1). The electric conductor wires (5, 6) occupy 50% to 85% of the cross-sectional area of the inside of the tube (1) and are uniformly distributed over the cross-section. The electric conductor wires are preferably either twisted (5) or woven (6).

4 Claims, 4 Drawing Figures

FIG. 1 (a) PRIOR ART
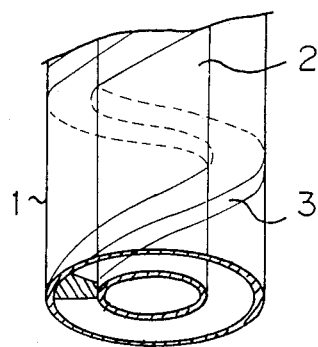
FIG. 1 (b) PRIOR ART
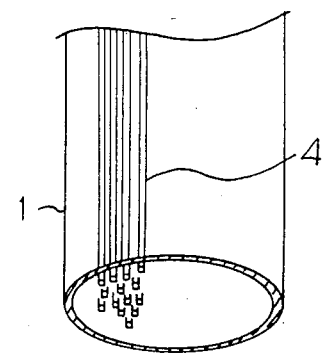
FIG. 2 (a)
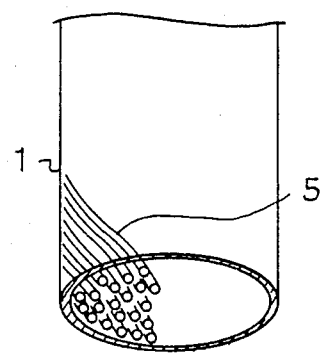
FIG. 2 (b)
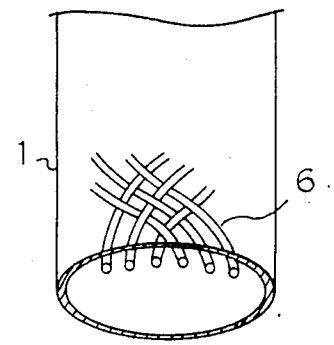

GAS COOLED CURRENT LEAD FOR SUPERCONDUCTING MACHINE

BACKGROUND OF THE INVENTION

1. Field of the Invention

The present invention relates to a gas cooled current lead for a superconducting machine.

A superconducting machine operated using liquid helium has a tendency to grow larger increasingly and for its electric current to increase in strength. Such a machine requires a current lead for carrying an electric current from room temperature to liquid helium temperature. The current lead is a significant source of heat leakage into the liquid helium temperature zone. The flow rate of helium gas cooling in the current lead is often required to be larger than the designed value for passing the necessary magnitude of electric current for the reason that the efficiency of heat exchange within the current lead is not as designed. In such a situation, there is a danger that the balance of the refrigeration system will be lost, thereby permitting the superconducting machine to fall into an inoperable state, since the helium gas which ought to be returned to a helium liquifier/refrigerator cooling the superconducting machine is instead used for the current lead. Such a state has hitherto often come about due to this problem.

A problem during manufacture of current leads is dependent on whether a structure having the same efficiency of heat exchange as designed and a manufacture thereof are possible or not. Generally, a current lead is composed of a conductive material capable of carrying a current inserted into a tube made of stainless steel, through which a helium gas passes. However, the current lead heretofore in use has been made as shown in FIGS. 1(a) and 2(b) because it is difficult to insert a conductive material into a long tube.

FIG. 1(a) shows a tube 1 made of stainless steel. A helical plastic spacer 3 and an electric conduit 2 are inserted in the tube 1. A cold helium gas runs helically between the plastic spacer 3 and the electric conduit 2.

The inside of the electric conduit 2 is made hollow. With this type of current lead, the efficiency of heat exchange is low, since the contacting area between the electric conduit 2 and the helium gas is small.

FIG. 1(b) shows a tube 1 made of stainless steel. A number of fine electric conductor wires 4 are inserted in the tube 1. With this type of current lead, although the area of the fine electric conductor wires 4 contacting the helium gas is large, the percentage of the cross-sectional area of the inside of the tube 1 occupied by the fine electric conductor wires 4 is small, and the helium gas runs in a larger cross-sectional area. As a result, the efficiency of heat exchange is also low with this type of current lead.

OBJECT OF THE INVENTION

An object of the present invention is to provide a current lead free from the faults described above.

SUMMARY OF THE INVENTION

As the result of diligent research, the present inventors have invented a gas cooled current lead for superconducting machines for carrying an electric current from room temperature to a superconducting magnet at cryogenic temperature. A large number of electric conductor wires are inserted densely into a metal tube, thereby improving the heat exchange between the helium gas and the electric conductor wires.

BRIEF DESCRIPTION OF THE DRAWINGS

FIG. 1(a) shows diagrammatically the structure of a first type of conventional current lead.

FIG. 1(b) shows diagrammatically the structure of a second type of conventional current lead.

FIG. 2(a) shows diagrammatically the structure of at first embodiment of the present invention.

FIG. 2(b) shows diagrammatically the structure of a second embodiment of the present invention.

DESCRIPTION OF THE PREFERRED EMBODIMENTS

In FIGS. 2(a) and 2(b) twisted electric conductor wires 5 (FIG. 2(a)) or woven electric conductor wires 6 (FIG. 2(b)) are inserted into a tube 1 made of stainless steel so as to enlarge the percentage of the cross-sectiional area of the tube 1 occupied by electric conductor wires. This has been found to improve the efficiency of heat exchange and to make the stream of helium gas uniform.

Preferably, the electric conductor wires 5 or 6 occupy 50 to 85% of the cross-sectional area of the inside of the tube 1 and are uniformly distributed over the cross-section. Each individual electric conductor wire 5 or 6 preferably has a cross-sectional area that is less than 1/20,000 of the cross-sectional area of the inside of the tube 1.

The comparative experimental result of the current lead of the present invention and the conventional current lead is shown in Table 1.

TABLE 1

| Type | Rated magnitude of electrical current | Length mm | Designed value | Flow of helium gas for stabilized state g/s |
|---|---|---|---|---|
| FIG. 1 (a) | 2.145 A | 6.55 | 0.12 | 0.18 |
| FIG. 2 (a) | 2.145 A | 3.00 | 0.10 | 0.10 |

It has been found that considerably less heat loss is obtained in the present invention.

Further, a small amount of superconducting wires can be contained in the geometrical condition of conductive material. Accordingly, a portion of the conductive material can be maintained in the superconducting state. This decreases heat loss, since the gas temperature at the lower end of the current lead is lower than the critical temperature of the superconducting material.

What is claimed is:

1. A gas cooled current lead for carrying an electric current from room temperature to a superconducting machine at a cryogenic temperature, said lead comprising:
   (a) an outer tube containing a passageway and
   (b) a plurality of electric conductor wires disposed within said passageway, each one of said plurality of electric conductor wires having a cross-sectional area that is less than 1/20,000 of the cross-sectional area of said passageway, said plurality of electric conductor wires occupying between 50% and 85% of the cross-sectional area of said passageway and being uniformly distributed over the cross-sectional area of said passageway, whereby, in use, liquid helium at a cryogenic temperature can be passed among said plurality of electric conductor wires, efficiently cooling them.

2. A lead as recited in claim 1 wherein said electric conductor wires are twisted around the axis of said passageway.

3. A lead as recited in claim 1 wherein said electric conductor wires are woven around the axis of said passageway.

4. A lead as recited in claim 1 wherein said tube is made of stainless steel.

* * * * *